United States Patent

[11] 3,629,070

| | | | |
|---|---|---|---|
| [72] | Inventor | Raymond S. Stankiewicz Ellington, Conn. | |
| [21] | Appl. No. | 831,689 | |
| [22] | Filed | June 9, 1969 | |
| [45] | Patented | Dec. 21, 1971 | |
| [73] | Assignee | The United States of America as represented by the United States Atomic Energy Commission | |

[54] TEMPERATURE-ACTIVATED REACTOR CORE CLAMP
2 Claims, 4 Drawing Figs.

[52] U.S. Cl. .................................................. 176/87, 176/40, 176/85
[51] Int. Cl. ....................................................... G21c 13/04
[50] Field of Search ........................................... 176/76, 78, 40, 87, 85

[56] References Cited
UNITED STATES PATENTS

| 2,998,370 | 8/1961 | Gaunt et al. .................. | 204/193.2 |
|---|---|---|---|
| 3,104,218 | 9/1963 | Speidel et al. ................ | 176/78 |
| 3,124,514 | 3/1964 | Koutz et al. .................. | 176/40 X |
| 3,164,530 | 1/1965 | Banks ........................... | 176/87 |
| 3,180,799 | 4/1965 | Blake ............................ | 176/40 X |
| 3,215,608 | 11/1965 | Guenther ...................... | 176/87 |
| 3,248,299 | 4/1966 | Junkermann et al. ........ | 176/85 |
| 3,260,650 | 7/1966 | Kalk et al. .................... | 176/85 X |

*Primary Examiner*—Carl D. Quarforth
*Assistant Examiner*—Gary G. Solyst
*Attorney*—Roland A. Anderson ABSTRACT: A nuclear reactor core locking device which holds the fuel assembly loosely for refueling and less loosely against vibration under operating conditions. A U-shaped core retainer band surrounds and is spaced from the core. Contacting boxes are mounted in the channel attached by one or more bimetallic springs to the band. As heating up occurs the boxes are forced into contact with the core and the contact force increases with increasing temperature.

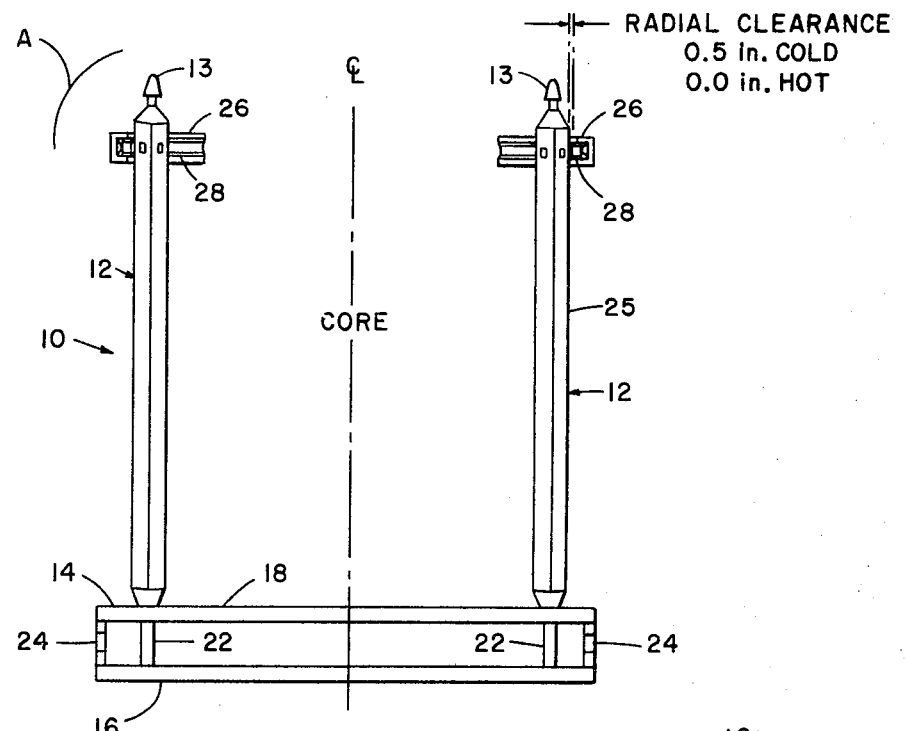
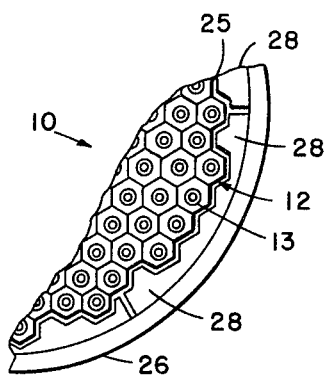
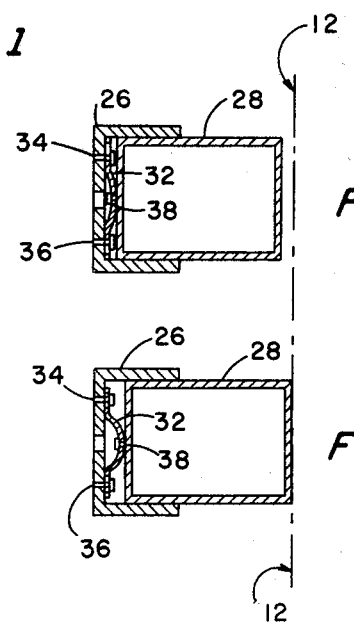
INVENTOR.
RAYMOND S. STANKIEWICZ

TEMPERATURE-ACTIVATED REACTOR CORE CLAMP

BACKGROUND OF THE INVENTION

The invention described herein was made in the course of, or under a contract with the United States Atomic Energy Commission.

In a typical fast breeder nuclear reactor employing bundles of fuel assembled into a core and provided with liquid metal cooling, temperatures are capable of fluctuating widely, for example, between 300° to 375° F. at refueling and 900° to 1,100° F. during normal operating conditions. Due to the presence of variable temperature gradients with consequent thermal expansion throughout the core and the effect of coolant flow and some turbulence, there is a tendency for vibrational effects to be induced by the combination of looseness of parts throughout the core with high-velocity coolant in various locations throughout the core. In the long run, the fuel bundles are subject to bowing and other adverse effects which decrease significantly the useful lifetime of the fuel between refueling. In my application entitled "Reactor Core Radial Locking Device," Ser. No. 741,960 filed on July 2, 1968, this problem is overcome in part by locking the fuel bundles against lateral movement and vibration through the use of a band constructed from a material of low coefficient of thermal expansion relative to the core structural material. Thus, as the core heated up, it expanded and ultimately reached the retainer band which then held the core tightly together during operation of the core. A difficulty yet to be overcome was that of providing a larger clearance, or looseness between the core and core retainer at low refueling temperatures. Under these conditions, the core is not in operation and there should be sufficient looseness to permit refueling at the lower operating temperatures.

In accordance with this invention, clamping of fuel bundles is enhanced or amplified in such a way as to permit sufficient looseness of the fuel bundles for low-temperature refueling operations and a stable, predictable compact core configuration at higher temperature operating conditions.

In a preferred embodiment of this invention, this is accomplished by utilizing bimetallic springs in cooperation with a retainer ring to force the movable core engagement sections inward to clamp the core as the temperature is raised to approach operating conditions. In other words, instead of providing a particular temperature at which firm clamping takes place there is a gradually increasing clamping action occurring which reaches its full value at operating temperature. At lower temperatures, where refueling for example might take place, the clamping is less firm, with greater looseness permitted to carry out the refueling with greater ease and less difficulty.

BRIEF DESCRIPTION OF THE DRAWING

FIG. 1 is an elevation view of a portion of a core embodying the principles of this invention;

FIG. 2 is a partial plan view of the core shown in FIG. 1;

FIG. 3a is an expanded view of detail A of FIG. 1 with no clamping;

FIG. 3b is similar to FIG. 3a except that the core is at an operating temperature and clamping is taking place because of the expanded bimetallic spring.

DESCRIPTION OF THE PREFERRED EMBODIMENT

Referring to FIGS. 1 and 2, nuclear reactor core 10 consists of an assembly of hexagonal fuel bundles 12 which rest on a core support structure 14 consisting of a pair of circular plates 16 and 18 with spacer members 22, 24, and others not shown for rendering structure 14 rigid and strong enough to support fuel bundles 12. As is understood in the art, while only two bundles 12 are illustrated in FIG. 1, a relatively large number of bundles 12 are assembled as shown in FIG. 2, each bundle at its lower end fitting into a slot or opening (not shown) in plate 18 to maintain alignment at the lower end. Each of fuel bundles 12 consists of an outer casing 25 made from a suitable structural material, and is filled with fissionable material as known in the art, coolant flowing through the interior of each bundle 12 for carrying away the heat of fission. Lower grid structure 18 would be provided with suitable openings to permit flow of coolant to enter and leave fuel bundles 12.

Surrounding the assembly of fuel bundles 12 near the upper portion thereof is a core band 26 whose cross section is U-shaped as illustrated. Along the inside of channel band 26 are a plurality of metal boxlike elements 28 which have a honeycomb profile inner edge (as shown in FIG. 2) to match the circumferential shape of the assembly of fuel bundles 12. Elements 28 are biased each by an elongated bimetallic spring 32.

Referring to FIGS. 3a and 3b, it will be noted that bimetallic spring 32 is clamped along the edges thereof by screws 34 and 36 to core band 26 and by one or more screws 38 to each element 28. Spring 32 may be a single spring completely filling the length of band 26 or a series of smaller spaced sections, if desired, filling the channel of band 26.

As is understood in the art, bimetallic spring 32 would be made of two layers of different metals having different thermal expansion rates so that increased clamping of fuel assemblies 12 occurs as the temperature in the core rises. It is also possible of course to select material and layer thickness to obtain exactly the type of clamping characteristic that is desired over a range of temperatures.

In the operation of this apparatus, during lower than operating temperatures, such as when shut down, box 28 does not contact bundles 12, as shown in FIG. 3a. When the temperature at core 10 and hence spring 32 rises, box 28 is forced inwardly by spring 32 to contact bundles 12. As the temperature continues to rise, the contact force is increased to increase the restraining effect on core 10. Thus at refueling temperature which is a low operating temperature, restraint is mild and sufficient looseness is present to make refueling more convenient and easier to conduct.

It is thus seen that there has been provided an arrangement for clamping or locking in place fuel within a nuclear reactor while at the same time permitting degrees of looseness at different operating temperatures to render fuel replacement more convenient and feasible.

While only a preferred embodiment of the invention has been described it is understood that many variations are possible without departing from the principles of this invention. For example, the core band may extend as a sleeve for the full length of the core. Hence the invention is to be defined by the scope of the appended claims.

I claim:

1. A nuclear reactor having a core which contains a plurality of fuel bundles and a clamping arrangement for said core which comprises:
    a. means for anchoring the ends of said fuel bundles;
    b. retainer band means surrounding and spaced from said bundles;
    c. movable means in the space between said bundles and said band means for contacting and clamping said bundles during operation of said reactor core; and
    d. spring means between and connected to both said band means and said movable means for maintaining a space between said bundles and said movable means at below operating temperatures of said core and maintaining such contacting and clamping at operating temperatures, said spring means including at least one bimetallic spring to increase the clamping force with increasing temperature whereby at reduced temperatures during reactor shutdown said fuel bundles remain free of clamping while at operating temperatures said fuel bundles become clamped by said movable means.

2. The clamping arrangement of claim 1 in which said band means is a U-shaped member having a channel with the latter facing said bundles, said movable means extending into said channel, and said bimetallic spring occupying the space in the bottom of said channel unoccupied by said movable means.